Sept. 29, 1936.     H. NEHLSEN     2,055,850
ELECTRIC DRIVING MEANS FOR ADJUSTABLE PARALLEL SHAFTS
Original Filed Jan. 23, 1935
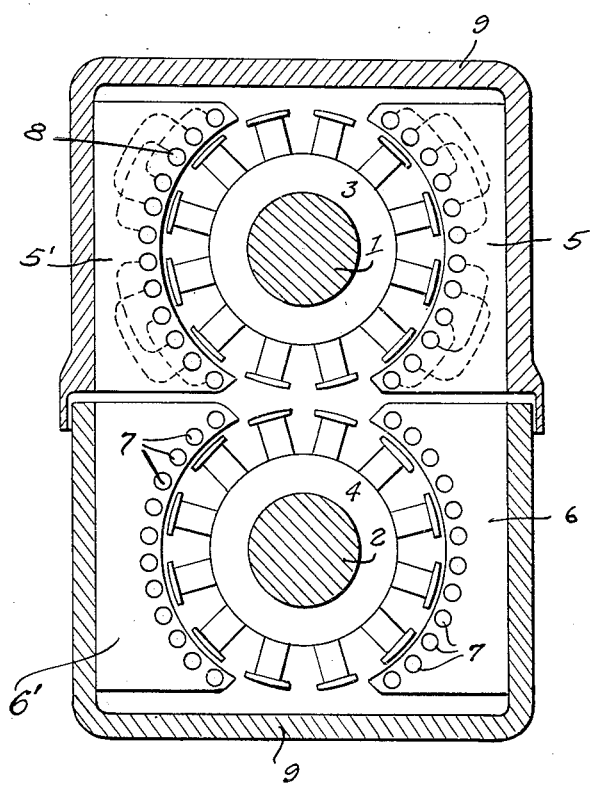
INVENTOR.
HERMANN. NEHLSEN
BY
ATTORNEY.

Patented Sept. 29, 1936

2,055,850

UNITED STATES PATENT OFFICE 2,055,850

ELECTRIC DRIVING MEANS FOR ADJUSTABLE PARALLEL SHAFTS

Hermann Nehlsen, Dusseldorf-Meererbusch, Germany, assignor to Schloemann Aktiengesellschaft, Dusseldorf, Germany, a corporation of Germany Original application January 23, 1935, Serial No. 3,003. Divided and this application September 18, 1935, Serial No. 41,129. In Germany January 21, 1932

2 Claims. (Cl. 172—36)

My invention relates to rolling mills, in which the rolls are each individually directly driven by an electric motor, the axes of which motors are disposed vertically one above the other, the rolls being supported upon the motor shafts as overhung rolls so that the space available for each motor in a vertical direction is determined by the distance between the axes of the rolls when they are nearest each other, all as described in my application, Serial No. 3,003, filed on January 23, 1935, patented March 31, 1936, No. 2,035,756, of which the present application is a division.

The space available for each driving motor in a vertical direction is fully utilized for the rotor diameter, the magnet system, together with the windings, being entirely located at the sides of the rotors. Thus, the armatures of the two motors are disposed one above the other, without any parts of the stator being located between them, so that the diameters of the rotors can be made sufficiently great to have powerful torques thereby produced.

According to this invention, with driving motors constructed as synchronous or asynchronous polyphase motors, the stator comprises two segments laterally engaging around the rotors and being magnetically separated from each other. For the purpose of increasing the number of poles, the stator windings are supplied with a current of a frequency which is a multiple of the usual mains frequency of fifty periods.

The invention will now be described in greater detail with reference to the accompanying drawing wherein an embodiment of the invention is shown by way of illustration, the single figure being a sectional elevation of a rolling mill, in which the rolls are individually driven by polyphase motors.

At 1 and 2 are shown very thick shafts of two superposed synchronous motors. 3 and 4 are rotating magnet wheels mounted respectively on shafts 1 and 2. At 5, 5′ and 6, 6′ are shown stator segments, not connected with each other, whereby the rotating magnet wheels 3 and 4 are set in rotation. As will be seen, the rotors fully occupy the vertical space determined by the minimum distance between the axes of the rolls (not shown), while the stator segments, together with the magnet system, are disposed entirely laterally relative to the rotors.

In the slots 7 of the stator segments is located the phase winding 8 which in the drawing is indicated for the upper motor only and which is so constructed that the coil ends lie in three different planes and, therefore, do not extend beyond the outer edges of the segments in the direction opposite to each other. In order to enable the winding to be so constructed, the motors are made with a comparatively large number of poles, for instance with twelve poles, as shown in the drawing. In this way there is an integral number of poles to be lodged in each stator segment and, therefore, a corresponding integral number of coils to be lodged for each phase. In the embodiment as shown each segment has four poles, with two coils for each phase. Because of the employment of a large number of poles the shafts can be made very thick, which is a very important feature, in view of the overhung arrangement of the rolls, since thereby the deflection of the shafts, due to the rolling pressure varying with the temperature of the material being rolled, can be greatly diminished, whereby the accuracy of the dimensions of the rolled material is considerably enhanced.

Because the rolls of wire and fine rod iron mills, for which the invention is primarily intended, mostly revolve at a high speed, up to about 1500 revolutions per minute, it is necessary to feed motors of such a large number of poles with currents of which the frequency is a multiple of the usual mains frequency of 50 periods. Thus, the motors shown in the drawing must be supplied with current having a frequency of 150 periods, if they are to run at 1500 revolutions per minute with the number of poles there provided.

Without the employment of these high frequencies the requisite gradations of speed of successive rolls, which must have a magnitude of about 20%, cannot be attained at all, for the normal mains frequency of 50 periods, with the range of speeds of revolution here in question, viz. from 600 to 1500 revolutions per minute, yields only gradations which are much too coarse. Since with continuous mill trains the speed of the roll housings always has to be adjusted in dependence upon the speed of the stages previously traversed by the work, a successful result can only in the rarest cases be obtained with the ordinary mains frequency, and, therefore, no disadvantage is to be seen in the fact that for the high-speed housings of the continuous trains a special polyphase alternating current of high frequency has to be generated.

The stator segments are enclosed in the motor casing 9, of which the upper part, for the purpose of protecting the inside of the motor, overlaps the lower one in a bell-like manner, as shown.

The driving motors may be either synchronous or asynchronous polyphase motors.

I claim:

1. A driving means for a pair of spaced parallel shafts relatively adjustable toward and away from each other, said driving means comprising an electric motor rotor on each shaft and a field structure for each rotor, said field structures being mounted for relative adjustment toward and away from each other with their related shafts and rotors, respectively, each field structure being disposed entirely laterally to its related rotor side of a plane at right angles to a plane including the axes of the shafts and tangent to the periphery of its related rotor at its point nearest the other rotor, whereby the field structures do not interfere with relative adjustment of the shafts, rotors and field structures toward each other substantially until the rotors contact with each other.

2. A driving means for a pair of shafts as set forth in claim 1 in which each field structure is disposed entirely laterally to its related rotor side of a plane at right angles to a plane including the axes of the shafts and tangent to the periphery of its related rotor at its point farthest from the other rotor.

HERMANN NEHLSEN.